April 11, 1944.   R. H. HEAD   2,346,431
FASTENER
Filed July 14, 1942
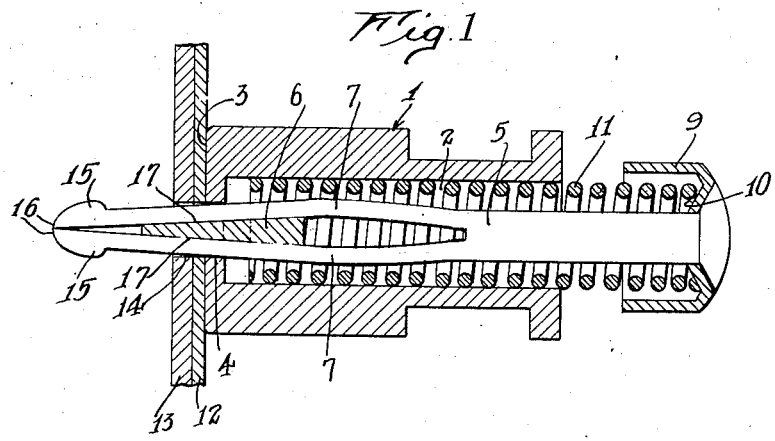
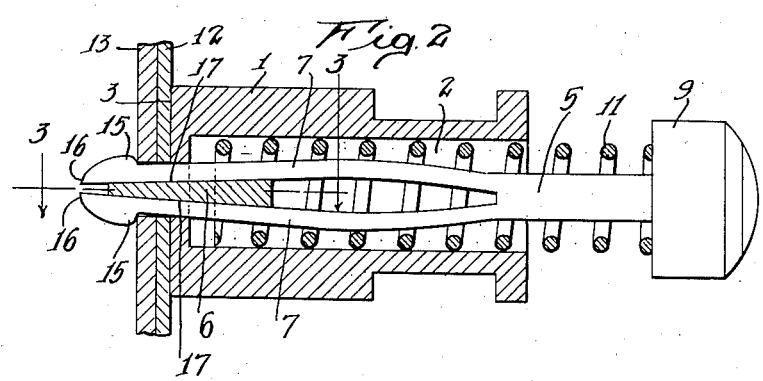
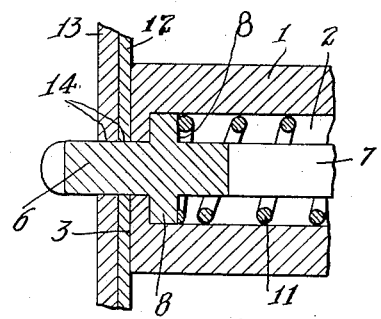
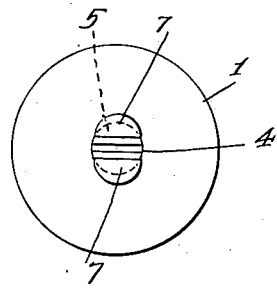
Inventor
Ralph H. Head
By Lyon & Lyon
Attorney Patented Apr. 11, 1944

2,346,431

UNITED STATES PATENT OFFICE 2,346,431

FASTENER

Ralph H. Head, Los Angeles, Calif.

Application July 14, 1942, Serial No. 450,845

3 Claims. (Cl. 85—5)

My invention relates to a fastener and more particularly to one for inserting through rivet holes in two or more sheets of material to bind the two sheets together and at the same time to concentrically align the said rivet holes.

In the present type of fasteners now used for the above stated purposes, there are several types using a bifurcated pin with a spreader between the arms of the pin. However, the difficulty in these fasteners is that there is no fastener which will allow the ends of the bifurcated pin to come together so as to insert the pin through the rivet holes without using the tapered surfaces of the ends of the bifurcated pin as a wedge to squeeze the ends of the pin together, when inserting or removing the fastener from the rivet holes. In all the present fasteners the spreader between the bifurcated pins has parallel sides. Several manufacturers have put a bend in the arms of the bifurcated pin below the spreader to cause the arms to come together when extended. While the fastener is new these bends in the pin arms will cause the ends of the spreader to come together. However, these fasteners are used many thousands of times and the bend in the pin arms is soon destroyed and the pin no longer comes together and must be forced in and out of the hole.

I have found that, by the use of a tapered spreader, the bifurcated pins need not be bent during the assembly of the fastener and will continue to come together at the ends no matter how many times the fastener is used.

It is, therefore, an object of my invention to provide a fastener for clamping together two or more sheets of material and concentrically aligning the rivet holes therein.

Another object of my invention is to provide a fastener which need not be forced in and out of the rivet holes in which it is inserted but has at all times clearance for insertion.

Other objects and advantages of my invention will be apparent from the following description of the preferred embodiments thereof.

Fig. 1 is a cross section of my fastener in extended position for insertion in rivet holes;

Fig. 2 is a cross section in clamping position;

Fig. 3 is a section taken on the line 3—3 of Fig. 2; and

Fig. 4 is an end view.

A fastener constructed in accordance with my invention comprises a body 1, having a central bore 2, and a face 3 through which a hole 4 extends into the central bore 2. A bifurcated pin 5 extending through the bore 2 and through the hole 4 has a diameter substantially that of the hole 4. A spreader 6 is inserted between the arms 7 of the bifurcated pin 5 and has a shoulder 8 extending outwardly, which engages the bottom of the bore 2. The spreader 6 is made of such width that at the point where the hole 4 goes into the bore 2 it will maintain the arms 7 of the bifurcated pin 5 substantially in contact with the walls of the hole 4. The bifurcated pin has a cap 9 on one end. Engaging the shoulder 8 of the spreader and the inner surface 10 of the cap is positioned a tension spring 11.

The material 12 and 13, having rivet holes 14, is clamped between the face 3 of the body 1 and the projections 15 on the bifurcated pin 5 by means of the tension exerted by the spring 11.

To permit insertion of the tool in the rivet holes 14, the bifurcated pin 5 and the projections 15 thereon, when the ends 16 are placed together, are slightly smaller than the diameter of the holes 14. The spreader 6 prevents this contact when in clamping position. In the fasteners of this type now in general use, the projections on the bifurcated pins are forced through the rivet holes. This is possible as the tapered surfaces on both sides of the projections, when shoved against the sides of the rivet holes, will squeeze together the arms of the bifurcated pin when the fastener is extended. Unless the bifurcated pin is made of very light and easily flexed material, this forcing will cause a tearing and misshaping of the rivet holes. If the pin is sufficiently light, there is a large amount of breakage of fasteners.

To overcome these two difficulties and to cause the ends 16 of the bifurcated pin 5 to come together, I have discovered that the spreader 6 should have its surfaces 17 contacting the arms 7, tapering with the large end of the taper in the bore 2 and the small end extending from the face 3. As the combined diameter of the arms 7 and spreader 6 at the entrance from the bore 2 to the hole 4 is substantially the diameter of the hole 4 and the spreader is of larger size in the bore 2 and smaller on its other end, the arms 7 will contact the tapered surfaces 17 and the ends of the arms will come into contact when the fastener is extended for insertion or removal.

The hole 4, because its diameter is only that of the combined diameter of the spreader 6 and the arms 7, forces the arms 7 together against the spreader and when the fastener is extended, as in Fig. 1, the edges of the hole 4 force the ends 16 together.

While I have described the preferred embodiments of my invention, I am not limited to any of the details of construction except as set forth in the following claims.

I claim:

1. In a fastener, a body, a bifurcated pin slidably mounted in said body, projections on the external end of said pin, tension means for clamping materials between said body and said projections, and a spreader to maintain the arms of said bifurcated pin in separated position when said fastener is in clamping position, said spreader being tapered to permit the said arms to substantially contact each other when said fastener has said bifurcated pin extended for insertion in a hole.

2. In a fastener, a body, a bifurcated pin slidably mounted in said body, projections on the external end of said pin, tension means for clamping materials between said body and said projections, and a spreader to maintain the arms of said bifurcated pin in separated position when said fastener is in clamping position, said spreader having one end extending from said body, said end being smaller than the end in said body, whereby the said arms are permitted to substantially contact each other when said fastener has said bifurcated pin extended for insertion in a hole.

3. In a fastener, a body, a bifurcated pin slidably mounted in said body, projections on the external end of said pin, tension means for clamping materials between said body and said projections, and a spreader to maintain the arms of said bifurcated pin in separated position when said fastener is in clamping position, said spreader being tapered with its end extending from the body smaller than its end within the body, and with the combined diameter of the bifurcated pin and the spreader at the hole through the body substantially that of the hole through the body, whereby said arms are permitted to substantially contact each other when said fastener has said bifurcated pin extended for insertion in a hole.

RALPH H. HEAD.